United States Patent [19]

Nicholson et al.

[11] Patent Number: 5,713,979
[45] Date of Patent: Feb. 3, 1998

[54] HEAT TREATMENT FACILITY FOR SYNTHETIC VITREOUS SILICA BODIES

[75] Inventors: Robert Nicholson, Tyne and Wear; Bernard Phillipe Robert Poullain, Newcastle-Upon-Tyne; Ian George Sayce, Northumberland, all of United Kingdom

[73] Assignee: TSL Group PLC, Tyne and Wear, United Kingdom

[21] Appl. No.: 335,789

[22] PCT Filed: May 13, 1993

[86] PCT No.: PCT/GB93/00983

§ 371 Date: Nov. 10, 1994

§ 102(e) Date: Nov. 10, 1994

[87] PCT Pub. No.: WO93/23341

PCT Pub. Date: Nov. 25, 1993

[30] Foreign Application Priority Data

May 14, 1992 [GB] United Kingdom ............... 9210327

[51] Int. Cl.⁶ .................. C03B 32/00; C03B 37/014; C03B 37/029
[52] U.S. Cl. .................. 65/424; 65/426; 65/427; 65/519; 65/530; 65/540; 65/374.13; 65/374.15
[58] Field of Search .............. 65/374.13, 374.15, 65/379, 384, 416, 426, 427, 424, 519, 540, 529, 530, 335, 377

[56] References Cited

U.S. PATENT DOCUMENTS

| | | | |
|---|---|---|---|
| 3,837,825 | 9/1974 | Loxley et al. | 65/18 |
| 3,972,704 | 8/1976 | Loxley et al. | 65/157 |
| 4,450,333 | 5/1984 | Andrejco et al. | 65/374.13 X |
| 4,547,644 | 10/1985 | Bair et al. | 65/374.13 X |
| 4,608,473 | 8/1986 | Pack et al. | 65/374.13 X |

Primary Examiner—Milton Cano
Attorney, Agent, or Firm—Howson and Howson

[57] ABSTRACT

An induction-heated furnace, suitable for heat treatment of synthetic silica bodies, under conditions of high purity, includes a tubular susceptor (1) disposed with its axis vertical and an induction coil (3) for raising the temperature of the susceptor. The susceptor is made from graphite and/or silicon carbide, and is enclosed within a vacuum envelope (2) made from vitreous silica or fused quartz, the envelope being surrounded by the induction coil which is liquid-cooled. The design is such that the vacuum envelope (2) operates at temperatures below those at which either devitrification or sagging of the envelope might occur even when the tubular susceptor (1) is heated to a temperature of 1700° C. Thus sintering of a porous synthetic silica body (9) can be carried out under atmospheric or reduced pressure, the furnace including a shaft (7) adapted to support the body to be heated and capable of rotation about and movement along said vertical axis of the tubular susceptor (1).

29 Claims, 2 Drawing Sheets

HEAT TREATMENT FACILITY FOR SYNTHETIC VITREOUS SILICA BODIES

BACKGROUND OF THE INVENTION

1. Field of the Invention

This invention relates to an improved heat treatment furnace and facility for the manufacture of large synthetic vitreous silica bodies.

2. Description of the Related Art

The manufacture of high purity vitreous silica bodies is of growing commercial importance due, in particular, to the needs of the optical fibre and semiconductor industries. Initially the requirements of these industries could be met with fused quartz glasses, made by melting highly refined quartz crystal powders by using electrical or flame fusion techniques. As purity requirements have advanced, however, it has been increasingly difficult, using naturally occurring crystal feedstocks, to achieve the purities sought and attention has turned to alternative synthetic sources of vitreous silica. Much work has been published concerning such alternative routes, the most important of which have been vapour deposition and sol-gel or related techniques.

For example, large bodies of porous synthetic vitreous silica can now be made by deposition of silica soot from a flame, in which silicon tetrachloride or an alternative volatile silicon-containing compound is hydrolysed or oxidised in a hydrogen-oxygen, or methane-oxygen flame. The flux of silica micro-particles is typically directed at a rotating cylindrical substrate, where it deposits as a porous body of pure vitreous silica, frequently known as a silica soot body. This soot body is subsequently converted to glass by a process of sintering, (also referred to as consolidation or vitrification). By adding appropriate dopant reagents to the flame, the soot body may be doped with either metallic or non-metallic species. Thus germanium, phosphorus etc., may be added as dopants to raise the refractive index of the product glass, and fluorine or boron may be added to reduce refractive index.

Such porous vitreous silica bodies may be alternatively made by casting shapes made using slurries of ultra-fine synthetic vitreous silica powders (e.g. P. K. Bachmann et al., Shape Forming of Synthetic Silica Tubes by Layerwise Centrifugal Particle Deposition, Ceramic Bulletin, 68(10), 1989), or by dry-pressing such powders (e.g. U.S. Pat. No. 4,620,862), or even by casting, from precipitated silica sols, though this last method presents problems for making large bodies.

In this specification it should be understood that where reference is made to a soot body, should the context allow, a body of porous synthetic silica derived from any alternative process is alternatively possible.

The above methods commonly give rise to solid or hollow cylindrical bodies of porous silica glass, typically of density 0.4 to 1.0 g/ml, which may subsequently be purified, for example by heating in a chlorine-containing gas. This treatment converts undesirable impurities in the glass into volatile chlorides which may thus be removed. Typical chlorine compounds include $Cl_2$, $SiCl_4$, $SOCl_2$, $COCl_2$ and $CCl_4$. Removal of transition metals, e.g., iron, is illustrated in the following equation:

$$SiO_{2(s)} + Fe_2O_{3(s)} + 3Cl_{2(g)} \rightarrow SiO_{2(s)} + 2FeCl_{3(g)} + 1\tfrac{1}{2}O_2 \qquad 1$$

Removal of OH (hydroxyl) from the glass is by formation of HCl gas, thus:

Another gas-phase process commonly undertaken to produce doped glass products for the optical fibre industry is treatment of the porous body in a fluorine-containing gas which, as noted above, yields a glass of lower refractive index. Typical dopant gases include $SiF_4$, $SF_6$, $CF_4$ and other fluorocarbons, or chlorofluorocarbons.

The above gaseous treatment processes are undertaken typically at temperatures of between 800° and 1200° C.

Following any such purification or doping treatment, the porous vitreous silica body is sintered, generally in an atmosphere of helium, or optionally helium plus some chlorine- or fluorine-containing gas. Helium comprises the bulk of the atmosphere since it is somewhat soluble in vitreous silica, and diffuses rapidly through the glass. Thus if, as sintering proceeds, some gas is trapped in a closed pore or bubble, provided that gas is comprised substantially of helium, it may escape by diffusion through the glass, and a transparent bubble-free product may thereby be achieved.

The above processes are now commonplace in the optical fibre industry, and operate satisfactorily on a small scale, however the products are expensive, and there is an urgent need to operate at larger scale and lower cost, while maintaining quality and purity.

Methods are being developed for making larger porous synthetic vitreous silica bodies, most importantly via soot-deposition techniques, notably by OVD, (Outside Vapour Deposition, the deposition of silica soot on the surface of a rotating cylindrical mandrel), and VAD, (Vapour-phase Axial Deposition, deposition of silica soot on the lower end of a cylindrical body rotating about a vertical axis). Such processes are adaptable to the large scale manufacture of cylindrical soot bodies, but purifying, doping and sintering of these bodies on large scale at low cost presents new problems.

Early furnaces for sintering porous silica soot bodies were generally vertical tube furnaces, comprising a cylindrical muffle tube, made from alumina or fused quartz, externally heated, in a central zone only, by an electric furnace with heating elements made from refractory metal, silicon carbide, or graphite, the muffle tube serving to contain the selected sintering gas atmosphere (e.g. helium) and to isolate the silica soot body from contaminants emanating from the heating elements, or the external environment. The soot body could thus be heat-treated in chlorine- or fluorine-containing gas within the muffle tube by raising or lowering through the central hot zone. Subsequently the body could be sintered progressively in the same manner, by passing slowly at a few millimeters per minute through the hot zone at a higher temperature than used for the earlier heat-treatment. In some cases the dehydration and sintering processes were undertaken simultaneously in a single zone-sintering step, at relatively high temperature. EP-A-170,249 describes such a muffle furnace and suggests alumina as a suitable material for the muffle tube.

This type of furnace operates successfully for small bodies, but has certain disadvantages. The alumina muffle tube contains impurities, e.g., alkali ions which may migrate as volatile species into the high purity silica product and lead to undesirable contamination. Again alumina is difficult to fabricate in long lengths, tubes are difficult to join, and the fitting of flanges for high temperature operation presents problems.

In this specification the term "muffle tube" should be taken to mean the innermost wall of a furnace, which is heated by conduction and radiation from one or more heaters which surround it, and within which the silica body is heat treated. The heat-treatment process may be a zone-heating process as described above, or may alternatively be such as to maintain the whole body at substantially the same temperature.

Fused quartz muffle tubes can be made of higher purity than alumina tubes, offer a low expansion coefficient, and can be fitted with flanges. However a fused quartz muffle tube still retains certain intrinsic disadvantages. At temperatures above about 1300° C. a fused quartz tube will exhibit viscous flow, and will sag or deform. For this reason the pressure within the muffle may not be allowed to differ significantly from that outside, or the tube will deform. Above about 1150° C. fused quartz has a tendency to devitrify, and if a partially devitrified tube is allowed to cool, the mismatch of expansion coefficient between glass and crystalline phases leads to stresses which may cause the tube to break. Finally, at high temperature and in atmospheres containing fluorine, a fused quartz muffle tube is subjected to an etching process, particularly when any moisture is present. This both shortens the life of the tube, and gives rise to gas-borne contamination, as impurities released from the fused quartz tube may migrate into the synthetic silica body, causing contamination thereof.

Despite these difficulties, vitreous silica and fused quartz muffle tubes are in wide usage, especially in the optical fibre industry, either in zone-sintering furnaces where the body moves through the hot-zone, or in an alternative type of zone sintering furnace where the hot-zone is moved along the body. EP-A-170,249, mentioned above, describes the use of a fused quartz muffle tube within a graphite furnace with relatively short hot-zone, and in an extension of the principle, U.S. Pat. No. 4,741,748 describes a furnace in which a muffle tube is surrounded by an elongated susceptor, made from graphite, thermally insulated, and contained within a fused quartz tube filled with inert gas. A graphite or alumina muffle tube is mentioned but a muffle tube of silica is preferred. The effect of zone-sintering is provided by moving a short induction coil which surrounds the outer silica tube up or down the assembly. This generates a short moving hot-zone in the graphite susceptor, and enables controlled heating and sintering processes to be undertaken. This arrangement has the advantage of reducing the overall height of the building required to handle a long vertically suspended body to approach a minimum of 2L, where L is the length of the body. The more conventional approach, with stationary hot-zone and moving body requires a building height of at least (4L+2H), where L is again the length of the body, and H is the length of the zone-sintering section of the furnace.

Despite this advantage, the furnace described in U.S. Pat. No. 4,741,748 exhibits a number of serious disadvantages. The design described necessitates elaborate precautions to permit expansion and contraction of components. It is necessary to maintain the internal silica muffle tube at a temperature above 1050° C. to avoid the breakage which would occur following the inevitable devitrification of the muffle tube in use. Whereas temperature is an important variable governing the processes in question, the fact that the hot-zone is moving renders temperature measurement difficult. At the temperature used for sintering the body, 1450° C., the vitreous silica muffle tube is in a softened state and liable to distort, necessitating care in use, and the maintenance of a raised internal pressure, to avoid collapse of the muffle tube. This type of furnace may thus be used only at pressures near to atmospheric, and thus the technology described necessitates the use of helium as sintering gas. However, helium is a rare gas, the cost of which represents a significant proportion of the total cost of the sintered silica product, and scarcity of which could present serious problems for future expansion of the technology.

Since helium contributes nothing to the process, apart from permitting processing at pressures near to atmospheric, it might appear obvious to attempt to heat-treat and sinter the porous silica body under vacuum, or at the appropriate (low) pressure of reagent gas (e.g., $Cl_2$, $SiF_4$ etc.). However, there are few references in the literature to such vacuum heat treatment of porous synthetic silica bodies. The main reason for this may be because it has proved difficult in the past to construct, at an acceptable cost, a large and practical vacuum furnace capable of operating under the exceptional conditions of ultra-high purity required for these applications.

One form of vacuum furnace that lacks a muffle tube has been proposed in GB-A-2,203,737, in which a synthetic silica soot body is sintered in vacuum or low pressure helium, while contained within an inductively-heated graphite tube which is rotating about a horizontal axis. It is claimed that this method has the advantage of yielding a cylindrical sintered product, even if the precursor soot body is not a perfect cylinder, i.e. in the softened state geometrical irregularities in the glass body may be removed because of the rolling action of the furnace.

However, if used on a large scale this technique would present a number of serious disadvantages, including problems of mechanical damage to the fragile soot body, for example on loading into the horizontal furnace, and would be expected to result in undesirable surface or even bulk contamination due to the constant rolling contact of the silica body with the graphite susceptor tube. Operation with reactive gases would present considerable difficulties due to the need to maintain moving parts at high temperature in a reactive gas medium, but at the same time avoiding corrosion of the equipment and contamination of the high purity glass. The concept is complex to engineer, and requires a large vacuum chamber to enclose a rotating furnace. The complexity and moving parts mean that clean, dust-free operation is impractical, yet the products are intended for customers who themselves insist on clean-room operation, and would prefer that their feedstocks had been prepared under clean-room conditions.

U.S. Pat. No. 4,969,941 describes a variety of alternative types of sintering furnace, all of which employ a heater (for example an electrically heated carbon heater), to heat a vertical tube furnace, as in the conventional design, but a muffle tube made from high purity carbon is used in the hot zone. The key feature of this design is that the carbon muffle tube must be rendered impervious, so that reactive gases within the muffle tube cannot escape into the outer regions and react with the components of the heater, liberating potential contaminants and shortening the life of the heater. Silicon carbide is proposed as such an impervious outer layer. Alternatively the carbon may be in the form of a thin pyrolytic deposit on the inner surface of a fused quartz tube. This complexity is because in the furnaces described it is essential to separate the heating means from the reactive gases within the muffle tube.

U.S. Pat. No. 4,969,941 incorporates further features of interest. In one embodiment a first and upper chamber is provided, in which the silica body is held in inert gas or under vacuum, to permit removal of any adsorbed moisture or oxygen. This has the effect of reducing the degree of contamination, and prolonging the life of the high purity carbon lining the muffle tube. In a further embodiment the actual sintering process was undertaken at reduced pressure, though by "whole-body" sintering, not zone sintering as would be preferred for the maintenance of good dimensions of the cylindrical soot body.

Although the detailed construction of the furnace is not explained in U.S. Pat. No. 4,969,941, vacuum sintering is apparently achieved by placing the entire assembly, including furnace elements, power leads etc., in a vacuum chamber, a difficult and extremely costly approach for treating large soot bodies, requiring a vacuum chamber of excessive proportions. The design also involves top-loading through the first or upper chamber, and this limits the possibility of integration of the total deposition and sintering processes, which is an object of the present invention.

U.S. Pat. No. 4,969,941 describes the employment of two separately heated chambers in an attempt to prevent the ingress of air or oxygen to the high temperature graphite sintering furnace. U.S. Pat. No. 5,032,079 describes an upper (preheating) furnace lined with fused quartz, and separated from a lower graphite-lined (sintering) furnace by a sliding valve. During sintering, upward leakage of helium past the valve ensures that the partial pressure of oxygen in the sintering chamber is minimised, and prolonged life of the graphite muffle tube is claimed. This approach still requires large volumes of helium, whose use would be minimised, or even eliminated if it were possible to evacuate the furnace. The construction has the added disadvantage that the body must be loaded through the top of the furnace. The total height of the facility must therefore be at least (4L+2H) where L is the length of the body, H is the length of the zone sintering region of the furnace.

It is desirable to be able to load a hot soot body into a preheated furnace but, with a top-loading furnace of this type, convective rise of the furnace gases would mean that the upper furnace will immediately fill with air, which must be eliminated by purging before the process can proceed, in order to avoid oxidation of the heated graphite parts, reducing their lifetime and giving rise to associated contamination. Purging of this type of furnace, operating at pressures near to atmospheric, is a slow process dependent on diffusion of inert gas through the furnace, and more particularly through the pores of the silica soot body, to replace the oxygen, water vapour etc., contained within the system. The operating temperature of the upper furnace is also limited to 800° C. by design considerations, in particular use of a quartz muffle tube.

It is a requirement of the optimum process for manufacturing synthetic silica bodies that the deposition, post-treatment and sintering processes be integrated as closely as possible. It is a further requirement that each step in this integrated process be such as to minimise the risk of mechanical damage to, or contamination of, the product glass body. These requirements are inadequately addressed in any of the above mentioned prior art, and this invention seeks to meet these requirements in a unique way.

A preferred method of manufacturing the porous synthetic silica body is by flame hydrolysis or oxidation of a silicon compound, usually $SiCl_4$, to deposit the porous soot body on the side of a mandrel (OVD), or on the end of a rotating cylindrical member (VAD). Immediately after deposition, the hot (e.g., 1000° C.) porous synthetic silica body is fragile, and readily contaminated, for example by gas-borne impurities or dust in the atmosphere. These may give rise to superficial contamination, and typically surface devitrification, or possibly to bulk contamination if the impurities are capable of penetrating the pores or diffusing through the glass. If subjected to thermal cycling, apart from the evident thermal and process inefficiencies, there is also a risk of cracking due to stresses set up in the porous synthetic silica body, or between the body and any supporting means (bait-piece, handle, mandrel etc.). Nevertheless, prior art processes generally require cooling of the soot body, prior to loading into the top of the heat-treatment/sintering furnace. Hot transfer of the soot body would avoid the above problems, and would give the additional advantage of reducing processing times, since it is evident that re-heating a large body of porous silica to a uniform temperature will take a long time, owing to the low thermal conductivity of the low density body.

Clearly it is desirable on conclusion of the deposition process to maintain the body at high temperature and progress it through subsequent stages in the operation without delay, and without exposure to the environment. Only when the soot body has been converted to a fully vitrified glass body and cooled to room temperature, should the body be exposed to any risk of contamination. This ideal mode of operation is not possible in any prior art heat treatment or sintering furnace we are aware of.

The present invention provides a furnace capable of overcoming all the problems inherent in the above-noted prior art processes in a cost-effective manner, and permits the manufacture of pure and doped synthetic silica bodies of very large size and with high productivity, without the use of large quantities of helium. While a furnace according to the invention may be used to heat treat porous silica bodies made by any process, including sol gel, and soot bodies made on a horizontal deposition lathe, it is particularly well adapted to receiving a porous, synthetic silica body made on a vertically oriented deposition lathe, i.e., a soot deposition facility in which silica soot is deposited to form a cylinder whose long axis is vertical, and which rotates about a vertical axis. The conventional VAD process is an example of such a process.

SUMMARY OF THE INVENTION

According to one aspect of the present invention there is provided a furnace suitable for the heat treatment and/or sintering of porous synthetic silica bodies, under conditions of high purity, under atmospheric or reduced pressure, comprising a tubular susceptor disposed with its axis vertical and a liquid cooled induction coil for raising the temperature of the susceptor, the susceptor being made from graphite and/or silicon carbide, and being enclosed within a vacuum envelope made from vitreous silica or fused quartz, and the envelope being surrounded by the liquid-cooled induction coil, the design being such that the vacuum envelope operates at temperatures below those at which either devitrification or sagging of the envelope might occur even when the tubular susceptor is heated to a temperature of 1700° C., the furnace further including a shaft capable of rotation about and movement along said vertical axis of the tubular susceptor, said shaft being adapted to support the body to be heated.

Preferably the tubular susceptor is surrounded by graphite felt, or a comparable refractory thermal insulating medium, forming an annular layer between the tubular susceptor and the cooled vacuum envelope.

Suitably the vacuum envelope is terminated below by a closure means and is supported from above by a carriage or the like movable support which permits the furnace to be moved horizontally smoothly from one processing station to another and, by actuating the closure means, to couple the vacuum envelope to a further, axially aligned, heat treatment chamber.

A furnace of this type may be used for whole-body heat treatment, or with a short hot-zone, for zone sintering. Indeed a furnace of this design could be used with a short but movable induction coil to provide a vacuum heat treatment and zone sintering furnace analogous to that described in U.S. Pat. No. 4,741,748 but offering significant advantages over that design. However, as noted above, one of the objectives of the present invention is to improve the handling procedures of these bodies, i.e. to avoid unnecessary thermal cycling, to avoid undesirable mechanical stresses, and to ensure minimal exposure to the environment.

Thus, according to a further aspect of the invention there is provided an assembly for heat treatment and/or sintering of synthetic silica soot bodies comprising at least two furnace chambers, the upper one being a furnace of the type described above, which can be moved to a position over a facility used for the deposition of a silica soot body, there permitting the loading of the soot body into the furnace chamber and its transfer under controlled gas environment and temperature to a position over a second furnace chamber in which zone sintering may be undertaken again under a controlled gas environment and under controlled conditions of temperature and pressure.

An assembly according to this further aspect of the invention facilitates the conventional processes of annealing, dehydration (i.e. removal of OH groups) by treatment with chlorine-containing gas, doping by treatment with fluorine-containing gas, and sintering of synthetic silica soot bodies, and also permits the unusual process of dehydration of a silica soot body by simple vacuum dehydration, or vacuum dehydration coupled by intermittent or continuous introduction of inert purge gas. Furthermore it is possible to effect dehydration of the soot body, by heating in a reducing gas, e.g. in the presence of hydrogen or by exchange with a deuterium-containing gas, i.e. introducing OD groups at the expense of OH groups.

BRIEF DESCRIPTION OF THE DRAWINGS

These constraints are fulfilled by the furnace assembly shown, by way of example, in the accompanying drawings, in which.

DESCRIPTION OF PREFERRED EMBODIMENTS

Figure 1:
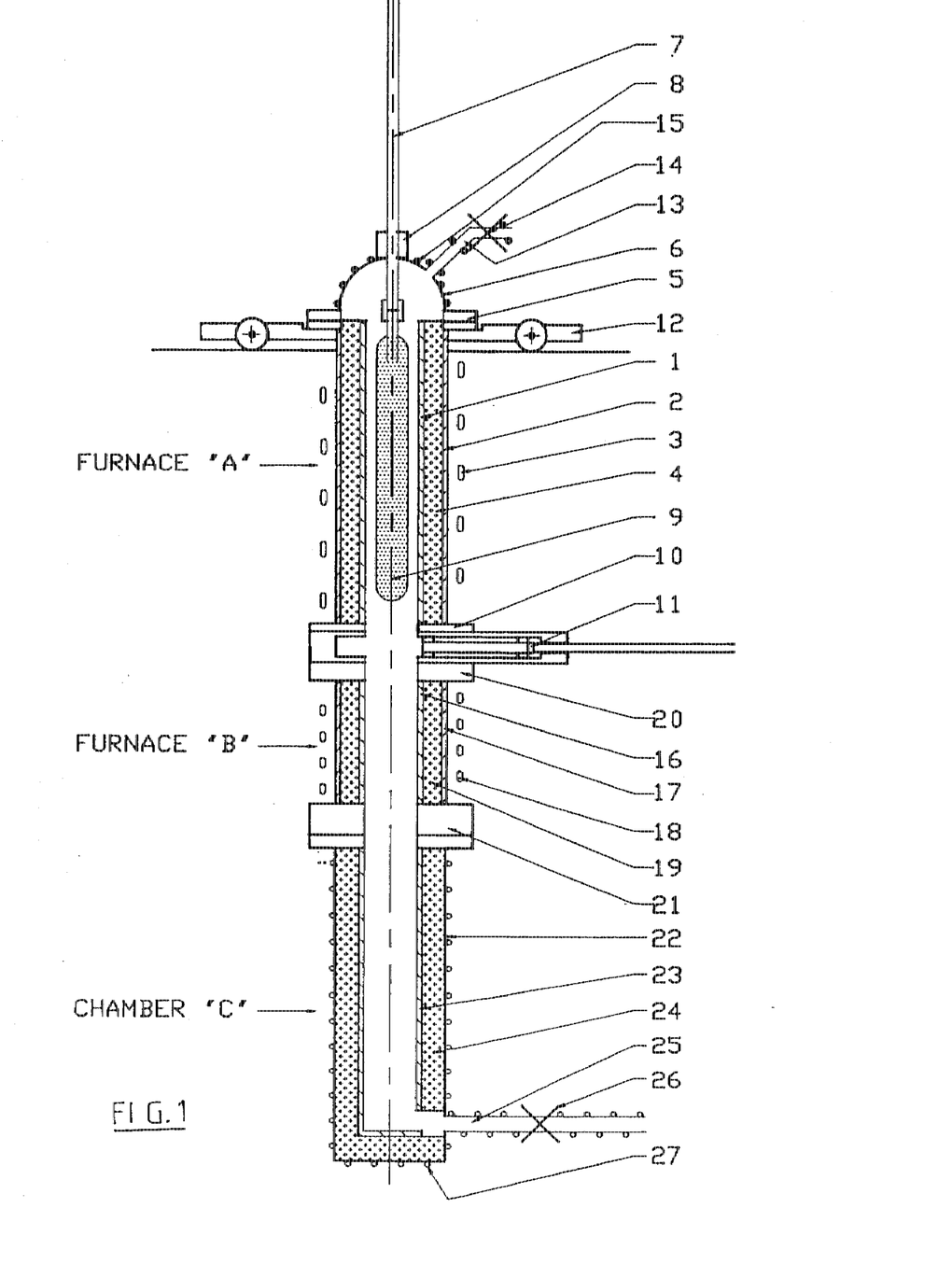
FIG. 1 is a sectional side view of a furnace assembly according to the invention.

Referring to FIG. 1 the furnace assembly comprises an upper furnace A, which may be operated independently or coupled to a second furnace B. Beneath the second furnace B is attached a receiving chamber C for treated product.

Figure 2:
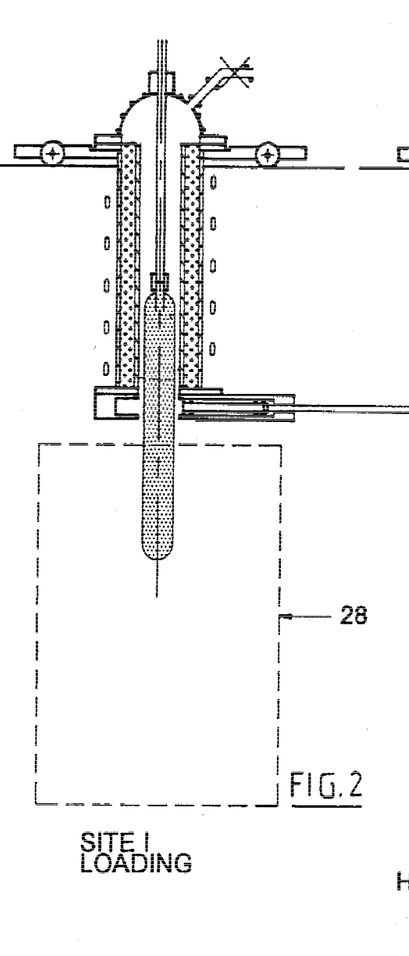
FIG. 2 is a view of the upper furnace part receiving a soot body at a charging location.
Figure 3:
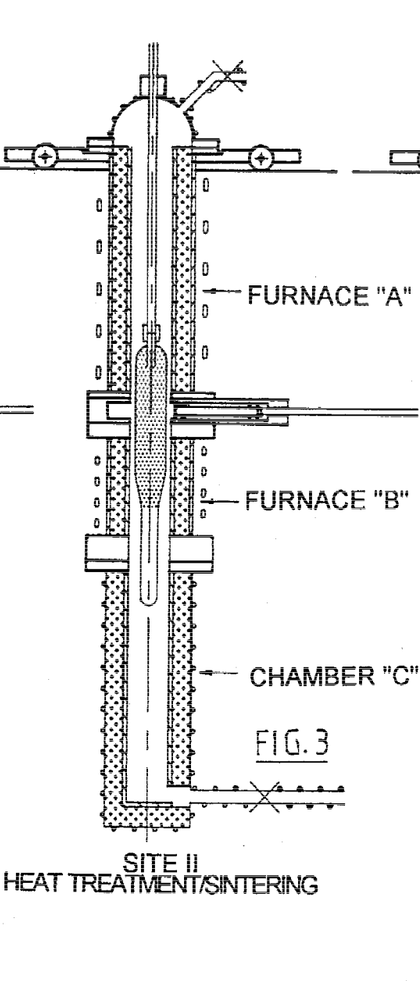
FIG. 3 is a view of the assembly shown in FIG. 1 with the soot body passing from the upper furnace part to the intermediate and lowermost furnace parts.
Figure 4:
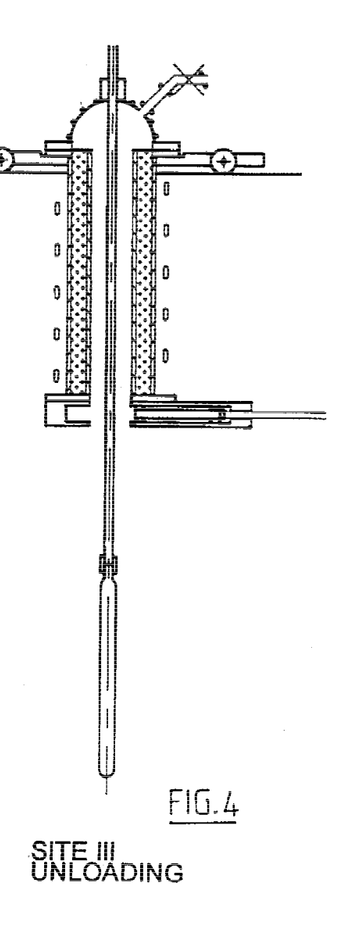
FIG. 4 is a view of the upper furnace part of FIG. 2, ready for unloading.

The upper furnace A may be moved by a swinging arm, carriage, hoist, crane or other means to one or more different sites within a building, three of these sites being shown in FIGS. 2, 3 and 4. Thus furnace A may be loaded at site I (FIG. 2), vertically over a deposition furnace shown in chain lines 28, moved to site II (FIG. 3), where it may be attached to a second furnace B and a chamber C, and after completion of the heat-treatment process in furnace B the furnace A may be moved to an unloading site III (shown in FIG. 4).

A preferred design of furnace assembly will now be described in greater detail, with reference to FIG. 1.

The furnace A comprises an induction furnace, with a hollow cylindrical susceptor 1, made from high purity graphite (ash content preferably less than 10 ppm), silicon carbide or a combination of graphite and silicon carbide, contained within a substantial air-cooled fused silica tube 2, which serves also as a vacuum enclosure. The susceptor is heated by induction from a water-cooled coil 3 external to the cooled tube 2. Susceptor 1, and silica tube 2 are separated by thermal insulation 4, for example high purity graphite felt. The upper end of furnace A is sealed (e.g. via a water-cooled metal flange 5 and a water-cooled metal dome 6), through which projects a water-cooled metal shaft 7. This shaft enters via a vacuum feed-through 8, which permits vertical movements of the shaft up and down and rotation about a vertical axis in either direction. A synthetic silica soot body 9 is suspended demountably from the lower end of the shaft. Drive mechanisms for the vertical and rotational movements of the shaft are not shown but can be of conventional design. Susceptor 1 is preferably at least as long as the soot body being heat-treated.

The lower end of furnace A comprises a water-cooled flange 10 which incorporates an appropriate closure means, for example a sliding valve 11, which is designed to maintain a chosen gas atmosphere, or even to withstand a vacuum within the furnace A, when that furnace is used independently of furnace B.

The whole of furnace A as described above should be movable in a horizontal plane. One means of achieving this movement is by constructing furnace A such that it is suspended from a carriage 12 which supports the upper flange, dome, and shaft drive mechanisms. This carriage may be driven along a rail system between alternative furnace sites I, II and III. Swinging arm and other transport means may alternatively be used. Dome 6 and the lower flange 10 may incorporate means to introduce inert and/or process gases, and/or connection to a vacuum pumping system. These possibilities are represented schematically in FIG. 1 by a single inlet/exit pipe 13, fitted with a valve 14, but alternative pipework arrangements, not shown, are clearly possible. Appropriate water-cooling of metal parts is provided, for example by a cooling pipe 15.

Furnace B is desirably of similar construction but with a short hot-zone as required for zone-sintering of the soot body, when lowered, preferably with rotation, through the furnace. Thus furnace B comprises a susceptor 16 of high purity graphite (ash content preferably less than 10 ppm), silicon carbide or a combination, contained within a substantial air-cooled fused silica tube 17, which again serves as a vacuum enclosure. The susceptor 16 is desirably heated by induction from a further external water-cooled coil 18, and thermal insulation 19 is again provided between susceptor and silica tube (e.g. by graphite felt). End-closures are via water-cooled metal flanges 20 and 21.

Temperature monitoring and control of furnaces A and B may be via thermocouples, by pyrometers viewing through fused quartz windows welded to silica tubes 2 and 17, or attached elsewhere on the furnace assembly, or via fibre-optic pyrometers entering e.g. via the water-cooled flanges 5 and 21, or through fittings welded to the silica tubes 2 and 17.

Reception chamber C can be of simple design, comprising for example a water-cooled metal chamber 22, which may optionally contain an inner chamber 23, made from high purity graphite, and again thermal insulation 24 may be provided via graphite felt. Alternatively for some applications it may be desirable to omit the graphite inner chamber 23, and/or the thermal insulation 24, and thus to achieve more rapid cooling of the heat-treated product.

Means may be provided to introduce inert and/or process gas into furnace B, and/or to chamber C, or alternatively to connect these components to the vacuum system. These possibilities are represented schematically in FIG. 1 by a single inlet/exit pipe 25, fitted with a valve 26, but alternative pipework arrangements, not shown, are clearly possible. Appropriate water-cooling of chamber C is provided, for example by a cooling pipe 27.

The assembly is designed to permit operation of furnace A independently, or of the assembly ABC coupled together, under inert gas, e.g., argon, helium, or nitrogen, or with controlled pressure of reactive gas, or under vacuum. As reactive gases the following are examples of possible chlorinating/dehydrating gases, $Cl_2$, $SiCl_4$, $SOCl_2$, $COCl_2$, $CCl_4$, and other chlorinating species. Alternatively in the manufacture of fluorine-doped silica bodies the furnace gases may include $SiF_4$, $SF_6$, $CF_4$, or any of a range of other fluorocarbons, and chlorofluorocarbons. In the present invention, hydrogen or another hydrogen-containing reducing gas may also be employed as reactive gas, in order to effect a chlorine-free dehydration process. The above reactive gases may be used at a total pressure near to atmospheric pressure, diluted if required by one of the above-noted inert gases, or alternatively and advantageously, at controlled low pressure and in the absence of any inert gas.

Depending on the reactive gases to be used in the desired process sequence, the internal high temperature components may be selected from the group consisting of graphite, silicon carbide, and silica, the selection being such that there is no deleterious reaction of the components of furnaces A and B over the temperature range of normal operation of these components within the furnace. However, high purity graphite is generally the preferred material for both susceptors and thermal insulation for most applications.

It is important to note that the fused silica tubes 2 and 17, which serve as containment vessels for furnaces A and B respectively, being air-cooled, and heated only indirectly by conduction from the inner susceptors, never rise to a temperature at which gaseous attack, devitrification or slumping might be a problem even when the susceptors are at 1700° C. or above, and herein lies one of the major advantages of the invention, since the pressure within the muffle may be controlled, and does not have to be maintained near ambient pressure. Thus the use of vacuum prior to treatment with inert gas permits reduced process times, since gases may be driven through the pores under pressure, instead of relying on diffusion as in the prior art. This is particularly advantageous when low doping levels are required. The ability to sinter a silica soot body to a bubble-free glass without the need for helium represents another major advantage.

Any metal components of the assembly should be made from alloys which are adequately corrosion-resistant, and their respective temperatures appropriately controlled by means of thermal insulation, radiation shielding, water cooling etc. The most critical component is the water-cooled shaft, the surface of which may experience elevated temperatures during parts of the operation. Precautions must also be taken to ensure that all traces of reactive gases have been purged from the system before exposure to ambient atmosphere, otherwise ingress of moisture may give rise to undesirable corrosion of metal parts. Again the ability to evacuate the furnace greatly facilitates the removal of such reactive gases.

The pump system must also withstand corrosive gases (at least in the absence of moisture), and vacuum pump systems designed for use in the semiconductor industry may be used, for example appropriate oil-pumps, filled with unreactive oil, or preferably oil-free vacuum pumps, designed to handle these gases.

Where operation at a controlled partial pressure of reactive gas is required during operation of furnace A separately, or of the furnace assembly ABC, this can be achieved by admitting the appropriate gas, or gas mixture via one or more mass-flow controlled valves, and simultaneously exhausting the system via the above vacuum pump assembly.

An exhaust system for attachment to the furnace assembly is not shown, but can comprise for example a heat exchanger, a dust filter, the vacuum pumping system, and a wet scrubber system. Alternatively an appropriate cold trap system may be used to collect unused reagent and by-product gases.

It will be evident that, because furnace A is loaded and unloaded through the lower end, the height required is less than that of earlier furnaces with two hot-zones, e.g. U.S. Pat. No. 5,032,079. Thus a furnace assembly according to the present invention requires a building height of only (3L+2H), where L is the length of the soot body and H the length of the zone-sintering region of the furnace, i.e. furnace B. Such considerations are of considerable importance in view of the size of soot bodies which must be handled in a commercially viable process.

It will be further evident that bottom-loading of a hot body into preheated furnace A, does not result in filling of the furnace with air, with consequent risk of oxidation of the graphite parts, as in the case of top loading as in prior art furnaces. The transfer of a hot body is thus greatly facilitated, avoiding any undesirable cooling of the body after completion of the deposition process, and leading to a significant reduction in cycle time relative to earlier techniques.

A complete production unit may comprise one or more A-type furnace units, which may feed one or more BC units, being moved by an appropriate transport system. In this way a production facility may be designed to maximise the productivity of the units of each stage of the process, while minimising exposure of intermediate products to contamination or thermal stress.

If desired, the shaft 7 of furnace A may be extended downward through that furnace, and may then be used as the support shaft of the vertical soot deposition lathe. Under these circumstances it becomes unnecessary to remove the soot body from its supporting system on the lathe, and remount it on shaft 7. This might appear convenient, however there is a penalty, in that one furnace of type A is tied up for the duration of each soot deposition operation, and for maximum productivity this is not an ideal situation. The system has therefore been designed so that furnaces of type A may be operated independently of the deposition lathes which make up a production facility.

The concept of a vacuum furnace with cylindrical graphite susceptor contained within an evacuated fused silica tube, energised by an external water-cooled induction coil, is not new, however the development of the concept to permit treatment of porous silica bodies of ultra-pure synthetic silica, on an industrial scale, and with minimal contamination, is unique and novel, as is the coupling of such furnaces to permit operation of an integrated process.

GB-A-772,826 describes a furnace in which a graphite crucible heated by a graphite susceptor was used for the fusion of quartz grain, and again for the remelting of a fused quartz ingot, and its redraw into fused quartz tubing. Such a furnace was never used with inert or reactive gases, but only under vacuum. Thus the present invention incorporates several significant improvements over the technology represented by GB-A-772,826.

The present invention allows heat treatment and sintering operations to be undertaken under controlled gas environments, and even in the presence of reactive gases, to permit dehydration, purification or doping of the product, which possibilities were not conceived in GB-A-772,826.

Again the present invention makes it possible to couple in a single piece of equipment the two successive operations of vacuum heat treatment of a stationary porous silica body supported without contact with any container walls, and zone sintering of such a body while in motion, neither of which operations were possible in a furnace according to GB-A-772,826.

The furnace assembly described may be used for a variety of heat treatments under vacuum, under inert gas, or under controlled pressure of reactive gas. The following examples are illustrative, but do not represent the only ways of using this type of facility.

EXAMPLE 1

Simple Annealing/Vacuum Sintering

A synthetic vitreous silica body can be made by the following multi-step process.

Step 1. A synthetic silica soot body is built up on a vertical axis soot deposition lathe, adapted for vertical withdrawal of the product body. During the final stages of the deposition process, furnace A is moved into position over the lathe, flushed with inert gas (nitrogen or argon) and heated to a temperature of 1000° C.

Step 2. On completion of the deposition process, sliding valve 11 of furnace A is opened, and shaft 7 lowered into contact with a handle supporting the soot body. The two are coupled, and the hot soot body raised into the preheated furnace. Valve 11 is then closed and furnace A moved slowly into position over furnace B, which can be at room temperature, and filled with nitrogen.

Step 3. Furnace A is then lowered onto furnace B, the two are coupled, and the sliding valve 11 opened. The whole assembly can then be evacuated to a pressure of <0.5 torr, and the temperature raised to 1100° C. to permit partial dehydration. These conditions can be maintained for a period of for example 2 hours.

Step 4. When the assembly has achieved a pressure of less than 0.2 torr, the temperature of furnace B may be raised to 1600° C.

Step 5. The soot body can then be lowered through furnace B at a pressure of 0.2 torr, and temperature of 1600° C., at a rate of 5 mm/minute. After the entire soot body has been so treated, the furnace assembly is brought to atmospheric pressure by filling with nitrogen, and both furnaces are switched off and allowed to cool.

Step 6. The treated body is then raised into furnace A, which can then be uncoupled from the assembly, moved to the unloading site, and the product glass ingot lowered from the furnace, removed from the shaft, and taken away for further processing.

A product glass that is transparent and bubble-free, and with a hydroxyl content of around 120 ppm OH can be expected.

It will be apparent that if the sliding valve 11, fitted to furnace A, is designed to withstand a vacuum within this furnace, it is possible to achieve a similar result, but by a slight adjustment of process steps. Thus after loading the soot body into furnace A (Step 2), furnace A may be evacuated, and dehydration and related gaseous heat treatment processes may be effected while furnace A is detached from furnace B. This arrangement gives greater versatility to the facility, and, for example, in a multi-furnace system permits the use of several furnaces A, serving a smaller number of furnaces B.

In the above process steps, helium or argon may be used as inert gas in place of nitrogen.

EXAMPLE 2

Dehydration Purge/Vacuum Sintering

The conditions of Example 1 can be followed, but between Steps 3 and 4, the heat-treatment/dehydration with inert gas, is repeated. Then, after 2 hours at 1100° C. under vacuum, the furnace is filled with a dry inert gas (e.g. nitrogen or helium), and again evacuated. The temperature is maintained for a further 4 hours at 1100° C., before the cycle of Example 1 is resumed, and Steps 4–6 completed.

A product glass that is again transparent and bubble-free, and has a hydroxyl content of 80 ppm, significantly lower than that of Example 1, can be expected.

This approach for dehydration may be extended with repeated cycles of back-filling/re-evacuation, or alternatively dehydration may be achieved by prolonged vacuum heat treatment, with a controlled and continuous purge of dry inert gas, e.g. argon, helium, or nitrogen.

EXAMPLE 3

Hydrogen Treatment/Vacuum Sintering

The conditions of Example 2 can be repeated, but instead of using purely inert gas (e.g. nitrogen) for the second fill (Step 3), the furnace can be filled with a dry inert gas containing 3% hydrogen. The furnace can be maintained for a further 4 hours at 1150° C. with this atmosphere, and then the cycle of Example 1, Steps 4–6, can be repeated. Alternatively in place of a mixture of inert gas and hydrogen used above a suitable low partial pressure of pure hydrogen may be used.

The product glass should again be transparent and bubble-free, and should have a hydroxyl content of less the 5 ppm OH, demonstrating substantial removal of OH by the presence of hydrogen in the heat-treatment gas. The use of hydrogen to promote OH removal is unexpected, and while the mechanism of this dehydration process is uncertain, it is suggested that, during hydrogen pre-treatment there is some reduction of OH groups to give silane groups;

and subsequently, during vacuum heat-treatment, these silane groups react with residual OH groups with elimination of hydrogen.

This technique permits dehydration of a soot body without recourse to using a chlorine-containing gas, and the associated need for equipment for handling of toxic gas and for treating the effluent gases. Considerable savings are thus possible in both equipment and operating costs.

It is possible that the above reduction of ≡Si—OH to ≡Si—H is promoted by the strongly reducing conditions which prevail within a furnace according to the present invention. Indeed it is probable that a similar dehydration process can be undertaken using alternative chlorine-free reductant gases. Examples of such gases include ammonia, methane and other hydrocarbon gases monosilane ($SiH_4$), polysilane, or mixtures thereof. In the case of hydrocarbon gases, care must be exercised to avoid precipitation of unacceptable amounts of carbon within the pores of the soot body. The reductant gas may conveniently be diluted in helium as an inert carrier gas.

It should be noted that this process, while advantageously effected within a furnace according to the present invention, with consequent saving on the volume of expensive helium required, may equally be practised using helium as inert gas. Indeed by use of helium the process may be practised in conventional prior art or other designs of heat treatment furnace. Thus the process may be undertaken at total pressures near to atmospheric pressure by treating a soot or other porous synthetic silica body at a temperature of for example 1100° C. in a flow of helium containing a small proportion of hydrogen (e.g. 3%), followed by sintering at for example 1600° C. in an atmosphere of pure helium.

EXAMPLE 4

Dehydration/DeuteriumExchange/VacuumSintering.

The conditions of Example 2 can again be repeated, but instead of using purely inert gas (e.g. nitrogen) for the second fill (Step 3), the furnace is filled with inert gas containing 3% deuterium. The furnace can be maintained for a further 4 hours at 1100° C. with this atmosphere, and then the cycle of Example 1, Steps 4–6, can be repeated. Alternatively in place of the mixture of inert gas and deuterium a suitable low partial pressure of pure deuterium may be used.

The product glass would again be transparent and bubble-free, but should now have a hydroxyl content of less than 1 ppm OH, because of the substantial removal of all OH by exchange with deuterium in the purge gas.

Again it should be noted that this process may alternatively be practised using helium as inert gas both in a furnace according to the present invention and in conventional prior art or other designs of heat treatment furnace. Thus it may be undertaken at a total pressure near to atmospheric pressure by treating a soot or other porous synthetic silica body at a temperature of for example 1100° C. in a flow of helium containing a small proportion of deuterium (e.g. 3%), followed by sintering at for example 1600° C. in an atmosphere of pure helium.

The above examples of dehydration of soot bodies without the use of chlorine or other halogen-containing gases represent important developments of synthetic vitreous silica technology. Chlorine and chlorine-containing gases are noxious, and give rise to effluent gases which are undesirable pollutants. Furthermore, for some applications, e.g. high transparency in the ultraviolet region of the spectrum, chlorine may be an undesirable contaminant in the product glass, giving rise to defects on irradiation.

Clearly, the chlorine-free dehydration techniques made possible by the processes of the present invention may be advantageously associated with chlorine-free soot deposition processes, as for example those described in our co-pending application, GB-A-2,245,553. This aspect of the invention makes it possible to establish a complete manufacturing route for a low-OH synthetic silica glass without the use of any halogen-containing gases, and without releasing gaseous halogen-containing effluents into the environment.

EXAMPLE 5

Dehydration by Chlorine Treatment

The conditions of Example 1 can be repeated, but Steps 3 and 4 can be modified as follows.

Furnace A is lowered onto furnace B, the two are coupled and the sliding valve opened. The whole assembly is then evacuated to a pressure of 0.5 torr, the temperature of furnace A raised to 1100° C. and chlorine admitted to the furnace assembly at a controlled rate via a mass-flow controlled valve, while evacuation is continued, to maintain a pressure of 100 torr. This treatment should be continued for 2 hours, after which the chlorine flow is interrupted and the furnace is evacuated to a pressure of 0.2 torr.

Steps 5–6 of Example 1 can then be repeated.

A product glass which is transparent and bubble-free, and with a hydroxyl content of less than 0.1 ppm OH should result, demonstrating the dehydration effect of treatment with a chlorine-containing gas.

EXAMPLE 6

Fluorine Doping

The initial conditions of Example 5 are repeated, but after coupling of furnaces A and B and chlorine treatment, silicon tetrafluoride is admitted to the furnace assembly at a controlled rate via a mass-flow controlled valve, and evacuation is continued to maintain a pressure of 150 torr. The soot body is treated thus for 2 hours, and furnace B then heated to 1450° C. The soot body is then sintered by passing through furnace B, while the atmosphere of $SiF_4$ is maintained as above.

The furnace assembly is then evacuated, and refilled with argon, and then both furnaces are switched off and allowed to cool.

Step 6 is then undertaken as in Example 1. The product glass would have a hydroxyl content of less than 0.1 ppm OH, and have a fluorine content of typically 0.225% Atomic corresponding to a refractive index of 1.4573.

If the sliding valve 11 permits operation with a vacuum inside furnace A while this furnace is detached from furnace B (or while furnace B is filled with gas at, for example, atmospheric pressure), then the above pre-treatments of the soot body prior to sintering may be conveniently effected with process gas in furnace A only. This reduces both the time required for evacuation etc., and also the quantities of process gas required.

Summary of the novel features disclosed: A. A furnace design suitable for large scale treatment of synthetic silica soot bodies, under conditions of very high purity under vacuum under inert gas, at atmospheric or reduced pressure under controlled partial pressure of chlorinating and/or fluorinating gases, at atmospheric or reduced pressure optionally mixed with inert gas, under controlled partial pressure of reducing gas e.g. hydrogen, deuterium, or other hydrogen-containing gas, optionally mixed with inert gas.

B. The provision of one or more induction-heated furnaces, each with a susceptor made from graphite, silicon carbide, or a combination, and enclosed within a cylindrical vacuum envelope made from vitreous silica or fused quartz, with external water-cooled induction coil, designed for whole-body heat-treatment, or for zone-sintering, of synthetic silica soot bodies under controlled partial pressure of a range of different inert or reactive gases, or under vacuum.

C. A design which allows a large furnace to be made, and reactive, inert, or low pressure gas/vacuum to be contained therein, but unlike certain prior art furnaces which employ vitreous silica/fused quartz muffle tubes used at high temperature, a design in which the vitreous silica/fused quartz components of the furnace in accordance with the present invention operate well below temperatures at which either devitrification or sagging of the vitreous silica/fused quartz might occur, leading to long component life, minimum downtime, and convenience and economy in use.

D. A possibility for an assembly of two or more furnaces, designed for use independently, or coupled together, for the heat treatment or sintering of porous synthetic silica bodies.

E. An assembly for heat treatment and/or sintering synthetic silica soot bodies comprising at least two furnaces, at least one of which has a hot zone at least as long as the body to be treated, and which may be moved to link with the facility used for a previous operation, e.g. soot deposition furnace, there permitting the loading of the body, and its transfer under controlled gas environment and temperature to a second furnace in which zone sintering may be undertaken under controlled gas environment and temperature, such that large fragile soot bodies may be handled in an integrated plant with minimal mechanical or thermal stresses, and with minimum exposure to the environment, which might otherwise cause contamination of the ultrapure product.

F. Dehydration of a porous synthetic silica body by vacuum dehydration, or by vacuum dehydration coupled with intermittent or continuous introduction of inert purge gas, in the apparatus.

G. Dehydration of a porous synthetic silica body by vacuum heat treatment, coupled with intermittent or continuous introduction of a reactive, e.g. chlorine or fluorine-containing, gas.

H. Dehydration of a porous synthetic silica body, by vacuum dehydration coupled with heat-treatment with a hydrogen-containing chlorine-free reducing gas, prior to sintering in a hydrogen-free atmosphere, or under vacuum.

I. Dehydration of a silica soot body, (i.e. removal of OH groups), by a process involving exchange with a deuterium-containing gas, introducing OD Groups at the expense of OH. (In use in an optical fibre at conventional wavelengths OD is harmless, whereas OH leads to unacceptable absorption of infrared radiation being transmitted).

J. Sintering of a porous preform of amorphous synthetic silica (e.g. of predetermined shape) to achieve fully dense silica glass at lower temperatures (typically 1550°–1650° C.) with reduced risk of reaction and consequent contamination by suspending the porous body in space with no contact with either susceptor or container materials thus achieving product purities several orders of magnitude better than has earlier been possible.

We claim:

1. An induction heated furnace for heat treatment and/or sintering of synthetic silica bodies, under conditions of high purity comprising a tubular susceptor having an inner surface, the susceptor having a longitudinal axis extending vertically, means, located along said longitudinal axis, for supporting a synthetic silica body within the susceptor on said longitudinal axis but spaced from the inner surface of the susceptor, the susceptor being made from graphite and/or silicon carbide, means, comprising a gas-impermeable enclosure, for containing a vacuum or gas serving as an environment for the synthetic silica body during heat treatment and/or sintering, the enclosure being formed at least in part by an envelope surrounding the susceptor, the envelope being made from vitreous silica or fused quartz and serving to contain said environment, and the envelope and the susceptor both being surrounded by a liquid-cooled induction coil for raising the temperature of the susceptor, and closure means for closing said enclosure and maintaining said environment, wherein the envelope operates at temperatures below those at which either devitrification or sagging of the envelope can occur, whereby heat treatment and/or sintering of a porous synthetic silica body can be carried out under atmospheric or reduced pressure.

2. A furnace according to claim 1, in which the means for supporting a synthetic silica body within the susceptor comprises a shaft for rotating about and moving along said longitudinal axis of the tubular susceptor and for supporting the synthetic silica body.

3. A furnace according to claim 2, wherein the induction coil is substantially shorter than the tubular susceptor, and in which the induction coil is mounted to be moved over the envelope to provide a hot zone movable axially along said susceptor permitting progressive heat treatment or zone-sintering of a porous synthetic silica body contained therein.

4. A furnace according to claim 2, wherein said furnace comprises a further heat treatment chamber, wherein the envelope is terminated below by said closure means, and is supported from above by a movable support means which permits the tubular susceptor and envelope to be moved horizontally into axial alignment with said further heat treatment chamber, and wherein said closure means is actuable to couple the envelope to said further heat treatment chamber when the envelope and said further heat treatment chamber are in axial alignment.

5. An assembly for heat treatment and/or sintering of porous synthetic silica bodies comprising at least two furnace chambers, an upper one being a furnace according to claim 2, which can be moved to a position over a facility used for the deposition of a silica soot body, thereby permitting the loading of the soot body from below into the furnace chamber and its transfer under controlled gas environment and temperature to a position over a second furnace chamber, situated below the upper furnace chamber, in which second furnace chamber zone sintering may be undertaken again under a controlled gas environment and under controlled conditions of temperature and pressure.

6. A process for the dehydration of a porous synthetic silica body comprising the steps of loading said body into a furnace according to claim 2, thereafter establishing, in said furnace according to claim 2, an environment selected from the group consisting of a vacuum; a non-reactive chlorine-free gas; hydrogen; a hydrogen-containing, chlorine-free reducing gas; a deuterium containing gas; and a chlorine- or fluorine-containing gas, and heating said body, in said furnace according to claim 2, in said selected environment, at a temperature sufficient to effect substantial lowering of the hydroxyl content of said body, while maintaining the envelope at a temperature below that at which devitrification or sagging of the envelope can occur.

7. A process for the manufacture of a fluorine-doped synthetic silica glass body comprising the steps of loading said body into a furnace according claim 2, thereafter establishing, in said furnace, a gaseous atmosphere of a fluorine-containing gas, and heating said body: in said furnace according to claim 2, in said gaseous atmosphere, at a temperature sufficient to impart a substantial fluorine content to said body, while maintaining the envelope at a temperature below that at which devitrification or sagging of the envelope can occur.

8. A process for the manufacture of a synthetic silica glass containing less that 10 ppm OH comprising the steps of loading a porous synthetic silica body containing a higher OH level into a furnace according to claim 2, thereafter establishing, in said furnace according to claim 2, an atmosphere containing hydrogen or a hydrogen-containing, chlorine-free reducing gas selected from the group consisting of ammonia, methane, monosilane, a polysilane, and mixtures of these compounds, heating said body, in said furnace according to claim 2, in said atmosphere, at a temperature sufficient to effect lowering of the hydroxyl content of said body, while maintaining the envelope at a temperature below that at which devitrification or sagging of the envelope can occur, and thereafter sintering said body in an environment from the group consisting of a vacuum, and an atmosphere substantially free from any hydrogen-containing gases.

9. A process for the manufacture of a synthetic silica glass containing less than 10 ppm OH comprising the steps of loading a porous synthetic silica body containing a higher OH level into a furnace according to claim 2, thereafter establishing, in said furnace according to claim 2, an atmosphere containing a gas selected from the group consisting of deuterium, and a deuterium-containing, chlorine-free reducing gas, heating said body, in said furnace according to claim 2, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing or deuterium containing gases.

10. A furnace according to claim 1, wherein the induction coil is substantially shorter than the tubular susceptor in the direction of said longitudinal axis, and in which the induction coil is mounted to be moved over the envelope to provide a hot zone movable axially along said susceptor permitting progressive heat treatment or zone-sintering of a porous synthetic silica body contained therein.

11. A furnace according to claim 10, wherein said furnace comprises a further heat treatment chamber, wherein the envelope is terminated below by said closure means, and is supported from above by a movable support means which permits the tubular susceptor and envelope to be moved horizontally into axial alignment with said further heat treatment chamber, and wherein said closure means is actuable to couple the envelope to said further heat treatment chamber when the envelope and said further heat treatment chamber are in axial alignment.

12. A process for the dehydration of a porous synthetic silica body comprising the steps of loading said body into a furnace according to claim 10, thereafter establishing, in said furnace according to claim 10, an environment selected from the group consisting of a vacuum; a non-reactive chlorine-free gas; hydrogen; a hydrogen-containing, chlorine-free reducing gas; a deuterium-containing gas; and a chlorine- or fluorine-containing gas, the heating said body, in said furnace according to claim 10, in said selected environment, at a temperature sufficient to effect substantial lowering of the hydroxyl content of said body, while maintaining the envelope at a temperature below that at which devitrification or sagging of the envelope can occur.

13. A process for the manufacture of a fluorine-doped synthetic silica glass body comprising the steps of loading said body into a furnace according claim 10, thereafter establishing, in said furnace, a gaseous atmosphere of a fluorine-containing gas, and heating said body, in said furnace according to claim 10, in said gaseous atmosphere, at a temperature sufficient to impart a substantial fluorine content to said body, while maintaining the envelope at a temperature below that at which devitrification or sagging of the envelope can occur.

14. A process for the manufacture of a synthetic silica glass containing less that 10 ppm OH comprising the steps of loading a porous synthetic silica body containing a higher OH level into a furnace according to claim 10, establishing, in said furnace according to claim 10, an atmosphere containing hydrogen or a hydrogen-containing, chlorine-free reducing gas selected from the group consisting of ammonia, methane, monosilane, a polysilane, and mixtures of these compounds, heating said body, in said furnace according to claim 10, in said atmosphere, at a temperature sufficient to effect lowering of the hydroxyl content of said body, while maintaining the envelope at a temperature below that at which devitrification or sagging of the envelope can occur, and thereafter sintering said body in an environment from the group consisting of a vacuum, and an atmosphere substantially free from any hydrogen-containing gases.

15. A process for the manufacture of a synthetic silica glass containing less than 10 ppm OH comprising the steps of loading a porous synthetic silica body containing a higher OH level into a furnace according to claim 10, thereafter establishing, in said furnace according to claim 10, an atmosphere containing a gas selected from the group consisting of deuterium, and a deuterium-containing, chlorine-free reducing gas, heating said body, in said furnace according to claim 10, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing or deuterium containing gases.

16. A furnace according to claim 1, wherein the envelope is terminated below by said closure means, and is supported from above by a movable support means for moving said furnace horizontally into axial alignment with a further heat treatment chamber, and wherein said closure means is actuable to couple said furnace to said further heat treatment chamber when said furnace and said further heat treatment chamber are in axial alignment.

17. A process for the dehydration of a porous synthetic silica body comprising the steps of loading said body into a furnace according to claim 16, thereafter establishing, in said furnace according to claim 16, an environment selected from the group consisting of a vacuum; a non-reactive chlorine-free gas; hydrogen; a hydrogen-containing, chlorine-free reducing gas; a deuterium-containing gas; and a chlorine- or fluorine-containing gas, and heating said body, in said furnace according to claim 16, in said selected environment, at a temperature sufficient to effect substantial lowering of the hydroxyl content of said body, while maintaining the envelope at a temperature below that at which devitrification or sagging of the envelope can occur.

18. A process for the manufacture of a fluorine-doped synthetic silica glass body comprising the steps of loading said body into a furnace according claim 16, thereafter establishing, in said furnace, a gaseous atmosphere of a fluorine-containing gas, and heating said body, in said furnace according to claim 16, in said gaseous atmosphere, at a temperature sufficient to impart a substantial fluorine content to said body, while maintaining the envelope at a temperature below that at which devitrification or sagging of the envelope can occur.

19. A process for the manufacture of a synthetic silica glass containing less that 10 ppm OH comprising the steps of loading a porous synthetic silica body containing a higher OH level into a furnace according to claim 16, establishing, in said furnace according to claim 16, an atmosphere containing hydrogen or a hydrogen-containing, chlorine-free reducing gas selected from the group consisting of ammonia, methane, monosilane, a polysilane, and mixtures of these compounds, heating said body, in said furnace according to claim 16, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum, and an atmosphere substantially free from any hydrogen-containing gases.

20. A process for the manufacture of a synthetic silica glass containing less than 10 ppm OH comprising the steps of loading a porous synthetic silica body containing a higher OH level into a furnace according to claim 16, thereafter establishing, in said furnace according to claim 16, an atmosphere containing a gas selected from the group consisting of deuterium, and a deuterium-containing, chlorine-free reducing gas, heating said body in said furnace according to claim 16, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing or deuterium containing gases.

21. An assembly for heat treatment and/or sintering of porous synthetic silica bodies comprising at least two furnace chambers, an upper one being a furnace according to claim 1, which can be moved to a position over a facility used for the deposition of a silica soot body, thereby permitting the loading of the soot body from below into the upper furnace chamber and transfer of the soot body under controlled gas environment and temperature to a position over a second one of said furnace chambers, situated below the upper furnace chamber, whereby zone sintering may be undertaken again in the second furnace chamber under a controlled gas environment and under controlled conditions of temperature and pressure.

22. A process for the dehydration of a porous synthetic silica body comprising the steps of loading said body into an assembly according to claim 21, thereafter establishing, in said assembly according to claim 21, an environment selected from the group consisting of a vacuum; a non-reactive chlorine-free gas; hydrogen; a hydrogen-containing, chlorine-free reducing gas; a deuterium-containing gas; and a chlorine- or fluorine-containing gas, and heating said body, in said assembly according to claim 21, in said selected environment, at a temperature sufficient to effect substantial lowering of the hydroxyl content of said body, while maintaining the envelope at a temperature below that at which devitrification or sagging of the envelope can occur.

23. A process for the manufacture of a fluorine-doped synthetic silica glass body comprising the, steps of loading said body into an assembly according claim 21, thereafter establishing, in said assembly, a gaseous atmosphere of a fluorine-containing gas, and heating said body, in said assembly according to claim 21, in said gaseous atmosphere, at a temperature sufficient to impart a substantial fluorine content to said body, while maintaining the envelope at a temperature below that at which devitrification or sagging of the envelope can occur.

24. A process for the manufacture of a synthetic silica glass containing less that 10 ppm OH comprising the steps of loading a porous synthetic silica body containing a higher OH level into an assembly according to claim 21, thereafter establishing, in said assembly, an atmosphere containing hydrogen or a hydrogen-containing, chlorine-free reducing gas selected from the group consisting of ammonia, methane, monosilane, a polysilane, and mixtures of these compounds, heating said body, in said assembly according to claim 21, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum, and an atmosphere substantially free from any hydrogen-containing gases.

25. A process for the manufacture of a synthetic silica glass containing less than 10 ppm OH comprising the steps of loading a porous synthetic silica body containing a higher OH level into an assembly according to claim 21, establishing, in said assembly according to claim 21, an atmosphere containing a gas selected from the group consisting of deuterium, and a deuterium-containing, chlorine-free reducing gas, heating said body, in said assembly according to claim 21, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing or deuterium containing gases.

26. A process for the dehydration of a porous synthetic silica body comprising the steps of loading said body into a furnace according to claim 1, thereafter establishing, in said furnace, an environment selected from the group consisting of a vacuum; a non-reactive chlorine-free gas; hydrogen; a hydrogen-containing, chlorine-free reducing gas; a deuterium-containing gas; and a chlorine- or fluorine-containing gas, and heating said body, in said furnace, in said selected environment, to a temperature sufficient to effect substantial lowering of the hydroxyl content of said body, while maintaining the envelope at a temperature below that at which devitrification or sagging of the envelope can occur.

27. A process for the manufacture of a fluorine-doped synthetic silica glass body comprising the steps of loading said body into a furnace according to claim 1, thereafter establishing a gaseous atmosphere of a fluorine-containing gas in the furnace, and heat treating and/or sintering the body, in the furnace, in said gaseous atmosphere of a fluorine-containing gas at a temperature sufficient to impart a substantial fluorine content to said body, while maintaining the envelope at a temperature below that at which devitrification or sagging of the envelope can occur.

28. A process for the manufacture of a synthetic silica glass containing less that 10 ppm OH comprising the steps of loading a porous synthetic silica body containing a higher OH level into a furnace according to claim 1, thereafter establishing, in the furnace, an atmosphere containing hydrogen or a hydrogen-containing, chlorine-free reducing gas selected from the group consisting of ammonia, methane, monosilane, a polysilane, and mixtures of these compounds, heating said body, in the furnace, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing gases.

29. A process for the manufacture of a synthetic silica glass containing less than 10 ppm OH comprising the steps of loading a porous synthetic silica body containing a higher OH level into a furnace according to claim 1, thereafter establishing, in the furnace, an atmosphere containing a gas selected from the group consisting of deuterium, and a deuterium containing, chlorine-free reducing gas, heating said body, in the furnace, in said atmosphere, at a temperature sufficient to effect lowering of the hydroxyl content of said body, while maintaining the envelope at a temperature below that at which devitrification or sagging of the envelope can occur, and thereafter sintering said body in an environment selected from the group consisting of a vacuum and an atmosphere substantially free from any hydrogen-containing or deuterium-containing gases.

* * * * *